(12) United States Patent
Machida

(10) Patent No.: US 7,835,544 B2
(45) Date of Patent: Nov. 16, 2010

(54) METHOD AND SYSTEM FOR FAR FIELD IMAGE ABSOLUTE NAVIGATION SENSING

(75) Inventor: Akihiro Machida, Sunnyvale, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 1072 days.

(21) Appl. No.: 11/514,869

(22) Filed: Aug. 31, 2006

(65) Prior Publication Data
US 2008/0056599 A1    Mar. 6, 2008

(51) Int. Cl.
*G06K 9/00* (2006.01)
(52) U.S. Cl. .......................... 382/107; 463/30
(58) Field of Classification Search ................. 382/100, 382/181, 195, 199, 232, 237, 243, 254, 255, 382/263, 264, 265, 266; 463/1, 30; 345/156, 345/157, 158, 159, 161, 168, 173
See application file for complete search history.

(56) References Cited

U.S. PATENT DOCUMENTS

| | | | |
|---|---|---|---|
| 5,075,861 A * | 12/1991 | Hasson et al. ............... 701/220 |
| 5,803,810 A * | 9/1998 | Norton et al. ................. 463/36 |
| 5,881,321 A * | 3/1999 | Kivolowitz ................... 396/53 |
| 6,195,122 B1 * | 2/2001 | Vincent ....................... 348/169 |
| 6,292,215 B1 * | 9/2001 | Vincent ....................... 348/169 |
| 6,337,688 B1 * | 1/2002 | Berstis ........................ 345/473 |
| 6,483,874 B1 * | 11/2002 | Panusopone et al. ... 375/240.08 |
| 6,711,278 B1 * | 3/2004 | Gu et al. ...................... 382/103 |
| 7,596,466 B2 * | 9/2009 | Ohta ........................... 702/152 |
| 2002/0039111 A1 * | 4/2002 | Gips et al. ................... 345/700 |
| 2003/0086596 A1 * | 5/2003 | Hipp et al. .................. 382/128 |
| 2005/0116931 A1 | 6/2005 | Olbrich |
| 2006/0277571 A1 * | 12/2006 | Marks et al. .................. 725/37 |
| 2007/0049374 A1 * | 3/2007 | Ikeda et al. .................. 463/30 |
| 2007/0120979 A1 * | 5/2007 | Zhang et al. ................. 348/154 |

FOREIGN PATENT DOCUMENTS

| | | |
|---|---|---|
| WO | WO-02/065388 | 8/2002 |
| WO | WO-2004/047011 | 6/2004 |

OTHER PUBLICATIONS

Gain, Dirk, "Eignung von Video-Kompressionsverfahren Fur Laser-Lichtschnittsensoren," Universitat Stuttgart Fakultat Informatik (Nov. 15, 1997).
English language abstract of Gain, Dirk, "Eignung von Video-Kompressionsverfahren fur Laser-Lichtschnittsensoren," Universitat Stuttgart Fakultat Informatik (Nov. 15, 1997).

* cited by examiner

*Primary Examiner*—Andrew W Johns
*Assistant Examiner*—Tahmina Ansari

(57) ABSTRACT

A method and system for far field image navigation sensing are described. The method includes pre-processing an image from a remote beacon into gray scale and contour data. Multiple frames of the image, including the gray scale and contour data are buffered. The beacon image is reconstructed from the buffered frames, which include blur data related to the beacon image. A position of the beacon is measured from the buffered frames. The blur data are analyzed to generate a blur vector. The beacon position and blur vector are processed to generate navigation information based on the beacon.

20 Claims, 3 Drawing Sheets

METHOD AND SYSTEM FOR FAR FIELD IMAGE ABSOLUTE NAVIGATION SENSING

TECHNOLOGY

The present invention relates generally to the field of electronics. More specifically, embodiments of the present invention relate to image navigation sensing.

BACKGROUND

Electronic media such as television (TV) and computerized apparatus have many modern roles. Education and entertainment are among the most familiar of these roles. TV displayed electronic games have become very popular and commercially successful exemplars of these media and can be quite useful in fulfilling these roles.

To take advantage of contrasts in lighting sources, some TV based electronic games are used in a darkened or partially lit environment. A game player for example may sit comfortably on a couch, chair, cushion or carpet and use a remote control device to interact with an electronic game that is displayed to them on their TV from across the darkened room.

Some remote control gaming interfaces include a camera device, which senses the relative position of the remote control unit with respect to the TV screen. This provides a relative position input to a processor that controls the game. In such game modalities, the relative brightness of the TV screen provides an effective navigational beacon to achieve this input.

If the game player (e.g., user) moves the remote control unit, its camera "sees" the images upon which it is trained seem to move, thus sensing apparent motion from the TV screen beacon. The game controller translates related input from the camera device in terms of pixels and units of time. However, rapid movement of the remote control unit by the game player can be somewhat problematic. With rapid movement of the remote control device, calculation with the vector information becomes difficult to achieve between successive frames.

Thus, successive correlation algorithms and related processes used by the game controller can experience difficulty in achieving high speed absolute position sensing in free space using the TV screen as its beacon. Synchronization may be lost because, even where the remote control unit is returned to its original position, errors in the calculation process prevent the console from returning the TV screen image to the center of the console. This will typically be contrary to the user's expectation and can adversely affect the user's gaming experience.

SUMMARY

A method and system for far field image navigation sensing are disclosed. The method comprises pre-processing an image from a remote beacon into gray scale and contour data. Multiple frames of the image, including the gray scale and contour data are buffered. The beacon image is reconstructed from the buffered frames, which comprise blur data related to the beacon image. A position of the beacon is measured from the buffered frames. The blur data are analyzed to generate a blur vector. The beacon position and blur vector are processed to generate navigation information based on the beacon.

DETAILED DESCRIPTION

Figure 1:
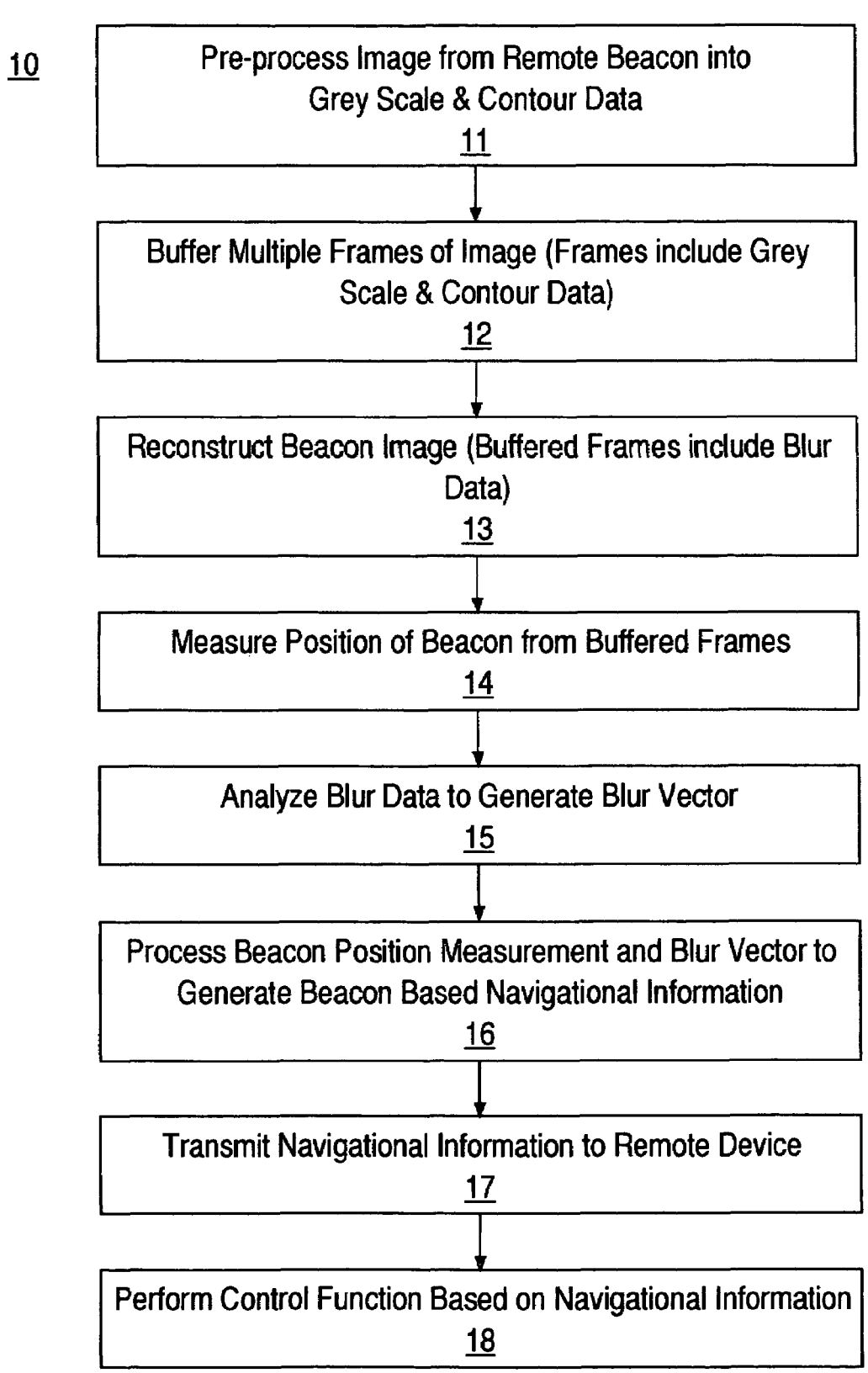
FIG. 1 depicts a flowchart of an exemplary method for far field image navigation sensing, according to an embodiment of the present invention.

Exemplary embodiments of methods and systems for far field image navigation sensing are described below. Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims.

Furthermore, in the following detailed description of exemplary embodiments of the present invention, numerous specific details are set forth in order to provide a thorough understanding of the present invention. However, one of ordinary skill in the art will realize that embodiments of the present invention may be practiced without these specific details. In other instances, well-known devices, methods, systems, processes, procedures, components, circuits and apparatus, protocols, standards, etc. have not been described in detail so as not to unnecessarily obscure aspects of the present invention.

Portions of the detailed description that follows are presented and discussed in terms of a process. Although blocks and sequencing thereof are disclosed in a flowchart figure herein (e.g., FIG. 1) describing the operations of this process, (e.g., process 10), such blocks and sequencing are exemplary. Embodiments of the present invention are well suited to performing various other blocks or variations of the blocks recited in the flowchart of the figure herein, and in a sequence, order, etc. other than that depicted and described herein, except as described herein otherwise.

In one embodiment, a process for far field image navigation sensing is performed with a computer based system. Means for performing a process for far field image navigation sensing include, in various embodiments, a variety of computer and imaging systems, devices, apparatus and communication media, including but not limited to cameras or other image capture devices, televisions and/or computer monitors, wireless and/or wire-based media and include software, hardware, firmware and/or combinations thereof. In one embodiment, such a process is performed with a computer under the control of computer readable code encoded upon (e.g., within) a computer readable medium.

Embodiments of the present invention relate to methods and systems for far field image navigation sensing. In one embodiment, a method for far field image navigation sensing comprises pre-processing an image from a remote beacon into gray scale and contour data. Multiple frames of the image, including the gray scale and contour data are buffered. The beacon image is reconstructed from the buffered frames, which comprise blur data related to the beacon image. A position of the beacon is measured from the buffered frames. The blur data are analyzed to generate a blur vector. The beacon position and blur vector are processed to generate navigation information based on the beacon.

Therefore, navigation sensing with vector information is achieved between successive frames even with rapid movement of remote control units, e.g., by a game player, which can be somewhat problematic with conventional approaches. Game controllers can overcome conventional difficulties to achieve high speed absolute position sensing in free space, e.g., using a TV screen as a beacon. Synchronization is preserved where remote control units are returned to an original position because errors in the calculation process are reduced, which conventionally prevent the console from returning the TV screen image to the center of the console. Thus, embodiments of the present invention conform to typical user expectations and promote the user's gaming experience.

Exemplary Method

FIG. 1 depicts a flowchart of an exemplary method 10 for far field image navigation sensing, according to an embodiment of the present invention. Method 10 begins with block 11, wherein an image from a remote beacon is pre-processing into gray scale and contour data.

In one embodiment, the remote beacon comprises a television (TV) screen. In one embodiment, the remote beacon comprises a computer monitor. In one embodiment, an image of the remote beacon is captured by a high speed camera or similar image capture device.

In block 12, multiple frames of the image, including the gray scale and contour data, are buffered. In block 13, the beacon image is reconstructed from the buffered frames, which comprise blur data related to the beacon image.

In block 14, a position of the beacon is measured from the buffered frames. In block 15, the blur data are analyzed to generate a blur vector. In block 16, the beacon position and blur vector are processed to generate navigation information based on the beacon.

In optional block 17, the navigational information is transmitted to a remote device. Transmission in various embodiments takes place over wireless and/or wire based media. In optional block 18, a control function is performed that is based on the navigational information. The control function can be applied to control of an electronic game, displayed for instance on the remote monitor.

Exemplary Systems

Figure 2:
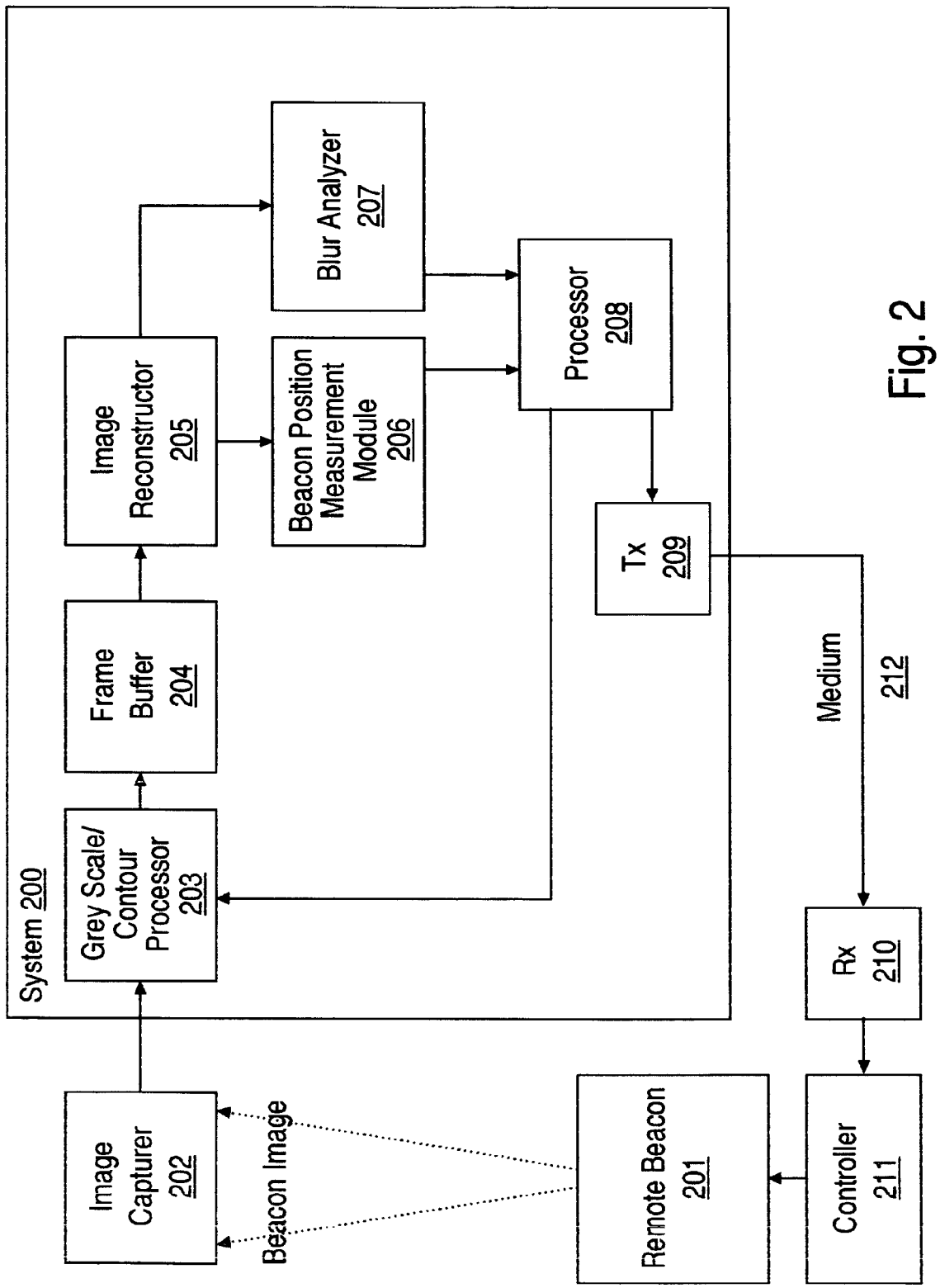
FIG. 2 depicts an exemplary computer based system for far field image navigation sensing, according to an embodiment of the present invention.

FIG. 2 depicts an exemplary computer based system 200 for far field image navigation sensing, according to an embodiment of the present invention. An image from a remote beacon such as a TV screen or computer monitor is captured by an image capturer 202, which can comprise a high speed camera or a similar image capture device. Image capturer 202 provides an input of the beacon image to system 200.

System 200 includes a gray scale and contour processor 203, which receives the beacon image. Grey scale and contour processor 203 processes the remote beacon 201 image input from image capturer 202 into gray scale and contour data. Multiple frames of the image, including the gray scale and contour data associated therewith, are buffered with frame buffer 204.

Image reconstructor 205 reconstructs the beacon image from the buffered frames, which include blur data. Beacon position measurement module 206 measures the position of the beacon from the gray scale and contour data in the buffered frames. Blur analyzer 207 analyzes the blur data therein and generates a corresponding blur vector. In one embodiment, beacon position measurement module 206 and blur analyzer 207 comprise a part, function, etc. of image reconstructor 205.

Processor 208 processes the beacon position measurement and blur vector to generate navigation information based on the remote beacon 201 and controls gray scale/contour processor 203 therewith.

In one embodiment, the navigational information generated with processor 208 is transmitted with transmitter 209, via a medium 212, to receiver 210. In one embodiment, medium 212 comprises a wireless medium. In one embodiment, medium 212 comprises a wire based medium. The navigational information received with receiver 210 is supplied to a controller 211, which performs a control function based thereon. For instance, controller 211 can control a game displayed on remote beacon 201 with the navigational information.

Figure 3:
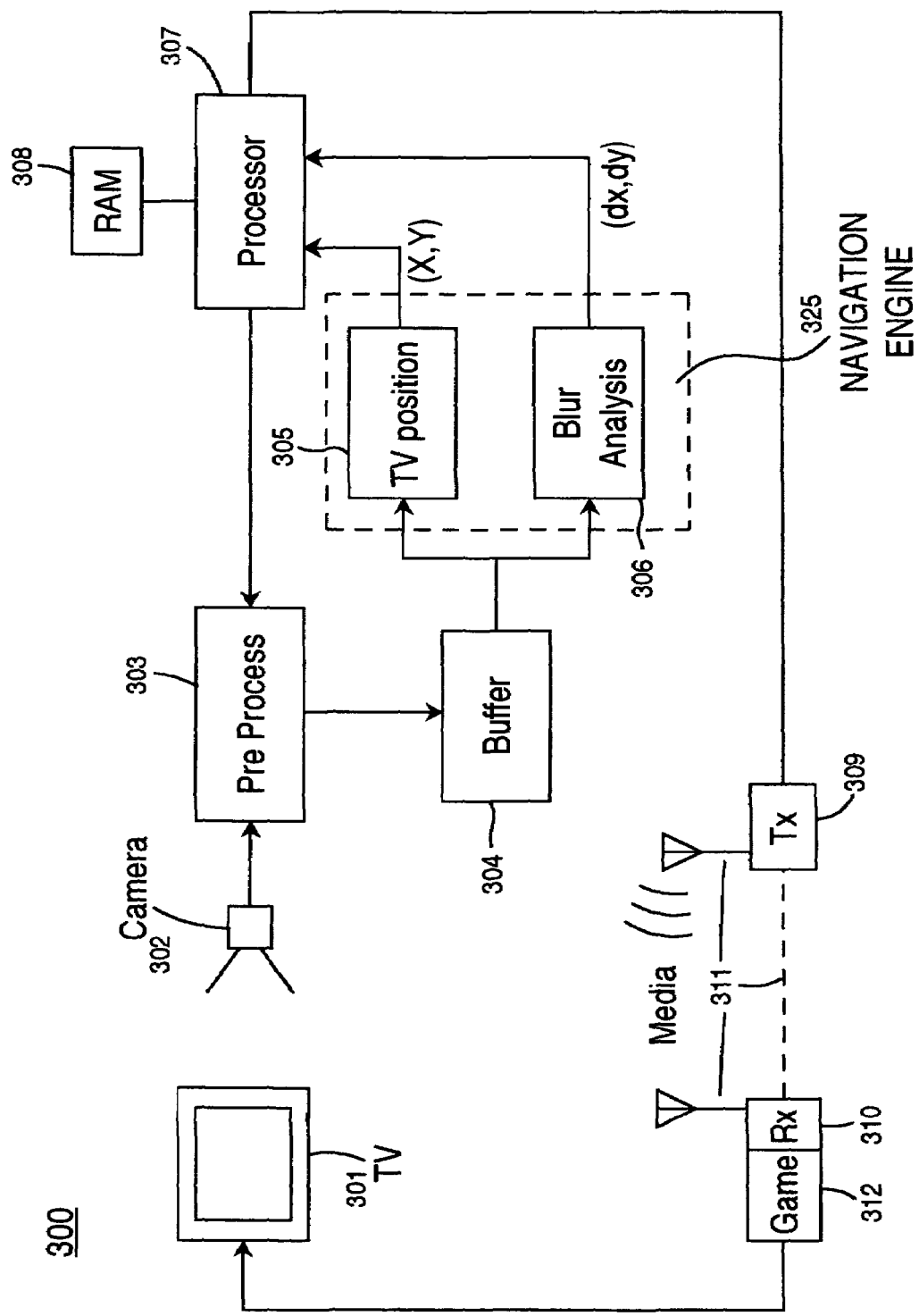
FIG. 3 depicts another exemplary system for far field image navigation sensing, according to an embodiment of the present invention.

FIG. 3 depicts another exemplary system 300 for far field image navigation sensing, according to an embodiment of the present invention. System 300 effectuates high speed absolute three axis tracking, using a high frame rate camera (or another image capture device) with a multiple navigation engine 325.

Navigation engine 325 functions with frame buffer 304 to reconstruct TV screen (or computer monitor, etc.) 301 as a navigation beacon. Advantageously, system 300 also uses information derived from the blurred beacon image for navigation functions. System 300 achieves high speed, effectively absolute position sensing in free space, using TV 301 as a navigational beacon. System 300 uses a fraction of the image that is displayed on TV 301.

Camera 300 operates at a high frame rate. In one implementation, camera 302 operates at 120 frames per second (fps). In one embodiment, camera 302 looks at the scanning electronic beam (e-beam) of TV 301. Image data captured with camera 302 is pre-processed with first processor 303 into gray scale and contour data, e.g., with methods known in the art. In one implementation an eight level gray scale is used.

Frame buffer 304 stores multiple frames from the high speed camera 302. The image displaying on TV beacon 301 can comprise interlaced frame images at a frame rate somewhat slower than that at which camera 302 operates. In one implementation, TV 301 operates at a frame rate of 30 fps. Thus, in one implementation, buffer 304 stores the four most recent frames. The multiple frames are combined, e.g., with image adding techniques known in the art, to achieve an effective reconstruction of the image displaying on TV 301, e.g., substantially in real time or in near real time.

The reconstructed image may show some deformation because camera 302 may be deployed with a remote control unit, which may be moved by a user. Importantly however, the images captured with camera 302 from TV beacon 301 are effectively reconstructed in the memory of the navigational system 300, e.g., with buffer 304. Thus, any such distortion is used therewith as a source of information relating to direction and speed of motion, e.g., of the user held remote control device with which camera 302 is deployed.

The reconstructed image comprises an input to navigation engine 325. In one embodiment, navigation engine 325 comprises a beacon (e.g., TV) position determining entity 305 and a blur analyzer 306. Position determiner 305 effectively measures the absolute position (x, y) of TV 301 within the field of view of camera 302.

The reconstructed image input from frame buffer 304 comprises a significant quantity of blur data, e.g., related to the movement of a remote control unit with which camera 302 is deployed. This blur data is analyzed with blur analyzer 306, which generates a corresponding blur vector (dx, dy).

The absolute position (x, y) of TV 301 and the corresponding blur vector (dx, dy) comprise inputs to second processor 307. In one embodiment, processor 307 functions with storage 308. In one embodiment, storage 308 comprises a memory device. In one embodiment, memory device 308 comprises random access memory (RAM).

Processor 307 processes the absolute position data (x, y) and the blur vector (dx, dy) and generates navigational information, based on the TV beacon 301. The navigational information provides in one embodiment to pre-processor 303. Further, in one embodiment, the navigational information generated with processor 307 provides a useful navigation based control signal.

For instance, in one implementation, navigation based information generated with processor 307 is transmitted with transmitter 309 via wire based and/or wireless interface and media 311 to a receiver 310. Receiver 310 provides the navigational information to a control entity 312.

In one embodiment, control entity 312 comprises a controller, such as for an electronic game. Images related to the electronic game are displayed on the TV 301. Thus, the navigation based control signal controls the image displayed on TV beacon 301.

In one sense, embodiments of the present invention advantageously simulate humanlike brain-eye action. The relatively fast acting human eye for instance sees the raster scan of TV 301. The human brain however functions relatively more slowly in the visual sense, ignoring the raster scan and "seeing," in the mental sense, the image being electronically "painted" with the raster scan.

System 300 is similarly dualistic: high speed camera 302 "sees" the e-beam raster scan in a way analogous to a humanlike eye. The buffer 304 and processor 307, in reconstructing the image from the four most recent frames and performing navigation related calculations with it, co-function analogously to a humanlike brain.

Embodiments of the present invention, methods and systems for far field image navigation sensing, are thus described. While the present invention has been described in particular embodiments, it should be appreciated that the present invention should not be construed as limited by such embodiments, but rather construed according to the following claims.

What is claimed is:

1. A method for far field image navigation sensing, comprising:
   capturing an image displayed on a display screen of a remote beacon using an image capture device;
   pre-processing said image displayed on said display screen into gray scale and contour data;
   buffering a plurality of frames of said image displayed on said display screen wherein said frames comprise said gray scale and contour data;
   reconstructing said image displayed on said display screen from said buffered frames wherein said buffered frames comprise blur data related to said image;
   measuring a position of said beacon from said buffered frames;
   analyzing said blur data to generate a blur vector; and
   processing said beacon position and said blur vector to generate navigation information based on said beacon.

2. The method as recited in claim 1 wherein said remote beacon comprises at least one of a television screen and a computer monitor.

3. The method as recited in claim 1, further comprising:
   performing a control function based on said navigation information.

4. The method as recited in claim 1, further comprising:
   transmitting said navigation information to a remote device.

5. The method as recited in claim 4 wherein said remote device comprises a control device.

6. The method as recited in claim 5 wherein said remote device comprises a game controller.

7. The method as recited in claim 6 wherein game controller controls a game wherein said game is displayed on said remote beacon.

8. A system for far field image navigation sensing, comprising:
   an image capture device, for sensing image information displayed on a display screen of a remote beacon;
   a first processor coupled to said image capture device, for pre-processing said image information displayed on said display screen into gray scale and contour data;
   a buffer coupled to said first processor, for storing a plurality of frames of said image information displayed on said display screen wherein said frames comprise said gray scale and contour data;
   a beacon position analyzer coupled to said buffer, for measuring a position of said beacon from said gray scale and contour data;
   a blur analyzer coupled to said buffer, for generating a blur vector based on said buffered frames; and
   a second processor coupled to said beacon position analyzer and said blur analyzer, for processing said beacon position and said blur vector to generate navigation information based on said beacon.

9. The system as recited in claim 8 wherein said remote beacon comprises at least one of a television screen and a computer monitor.

10. The system as recited in claim 1, further comprising:
    a storage component coupled to said second processor, for storing data related to said processing.

11. The system as recited in claim 10 wherein said storage component comprises memory.

12. The system as recited in claim 11 wherein said memory comprises random access memory.

13. The system as recited in claim 8, further comprising:
    a transmitting component coupled to said second processor, for transmitting said navigation information;
    a receiving component coupled to said transmitting component, for receiving said navigation information therefrom; and
    an interface medium for coupling said receiving component to said transmitting component.

14. The system as recited in claim 13 wherein said interface medium comprises a wire-based medium.

15. The system as recited in claim 13 wherein said interface medium comprises a wireless medium.

16. The system as recited in claim 13, further comprising:
    a control device coupled to said receiving component, for performing a control function based on said navigation information.

17. The system as recited in claim 16 wherein said control device comprises a game controller.

18. The system as recited in claim 17 wherein game controller controls a game wherein said game is displayed on said remote beacon.

19. A non-transitory computer readable medium having encoded thereon computer usable code for controlling a computer system to perform a process for far field image navigation sensing, said process comprising:

pre-processing an image displayed on a display screen of a remote beacon into gray scale and contour data, wherein said image displayed on said display screen is captured using an image capture device;

buffering a plurality of frames of said image displayed on said display screen wherein said frames comprise said gray scale and contour data;

reconstructing said image displayed on said display screen from said buffered frames wherein said buffered frames comprise blur data related to said image;

measuring a position of said beacon from said buffered frames;

analyzing said blur data to generate a blur vector; and processing said beacon position and said blur vector to generate navigation information based on said beacon.

20. A system for far field image navigation sensing, comprising:

an image capture device to capture an image displayed on a display screen of a remote beacon;

a first processor configured to process said image displayed on said display screen into gray scale and contour data;

means for buffering a plurality of frames of said image displayed on said display screen wherein said frames comprise said gray scale and contour data;

means for reconstructing said image displayed on said display screen from said buffered frames wherein said buffered frames comprise blur data related to said image;

means for measuring a position of said beacon from said buffered frames;

means for analyzing said blur data to generate a blur vector; and a second processor configured to process said beacon position and said blur vector to generate navigation information based on said beacon.

* * * * *